Figure 1:
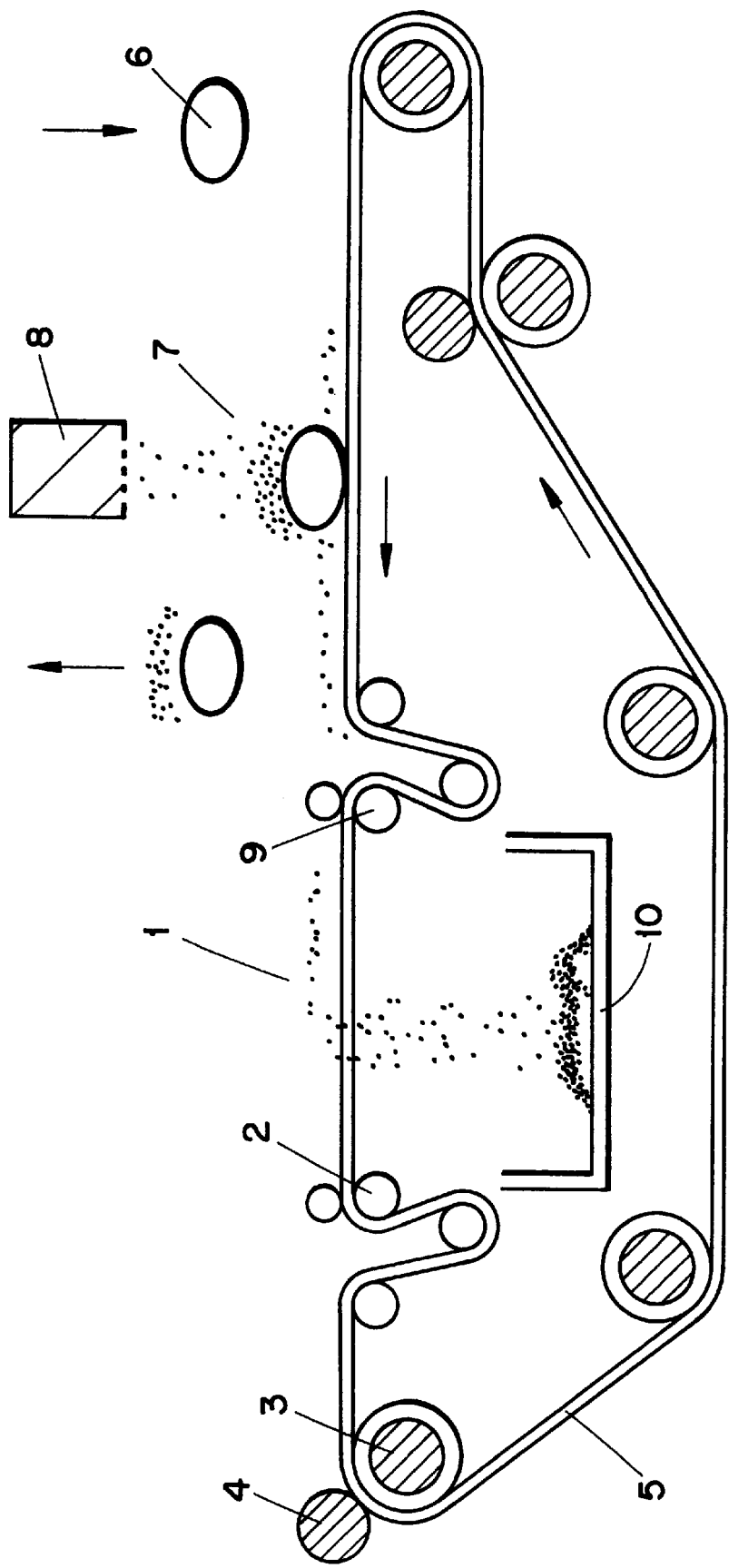

United States Patent [19]

Striegl et al.

[11] Patent Number: 6,095,321
[45] Date of Patent: Aug. 1, 2000

[54] CONVEYOR BELT CONTAINING ELASTIC YARNS

[75] Inventors: Peter Striegl; Achim Sohn, both of Bobingen, Germany

[73] Assignee: Johns Manville International, Inc., Denver, Colo.

[21] Appl. No.: 09/048,737

[22] Filed: Mar. 26, 1998

[30] Foreign Application Priority Data

Apr. 1, 1997 [DE] Germany ............................ 197 13 428

[51] Int. Cl.$^7$ ................................................. B65G 15/34
[52] U.S. Cl. .......................................................... 198/847
[58] Field of Search ..................................... 198/846, 847

[56] References Cited

U.S. PATENT DOCUMENTS

| | | | |
|---|---|---|---|
| 4,877,126 | 10/1989 | van Calker et al. ..................... | 198/847 |
| 4,896,765 | 1/1990 | Loose ...................................... | 198/847 |
| 4,928,812 | 5/1990 | van Calker et al. ..................... | 198/847 |
| 4,957,194 | 9/1990 | Wokke et al. ........................... | 198/847 |
| 5,766,421 | 6/1998 | Aufrecht ............................... | 198/847 X |

*Primary Examiner*—James R. Bidwell
*Attorney, Agent, or Firm*—Burns, Doane, Swecker & Mathis, L.L.P.

[57] ABSTRACT

A conveyor belt (5) for transport systems is described, containing an areal textile configuration based on predominantly synthetic yarns, characterized in that the conveyor belt has the form of an endless strip and the yarns extending in the running direction of the conveyor belt are elastic, the elastic yarns having a maximum tensile elongation of at least 60% and consisting at least 70 wt. %, referred to total yarn weight, of a thermoplastic, elastomer copolyether ester containing recurrent structural units of formulas I and II, $$—O—OC—Ar^2—CO—O—R^4— \quad (I)$$

and $$—O—OC—Ar^3—CO—O—R^5— \quad (II),$$

where $Ar^2$ and $Ar^3$ independently of each other represent bivalent aromatic radicals, $R^4$ represents a bivalent aliphatic or cycloaliphatic radical, and $R^5$ stands for the bivalent radical of a polyalkylene ether.

6 Claims, 2 Drawing Sheets

CONVEYOR BELT CONTAINING ELASTIC YARNS

The present invention relates to conveyor belts containing an areal textile configuration based on predominantly synthetic yarns, the use of a belt in conveyor systems, particularly conveyor belts in the foods industry, mining or the dye industry, a method of conveying goods by means of a traveling belt, and a conveyor device comprising guide elements that propel a belt.

Conveyor belts are employed in mining, in heavy and light industry, in machinery and equipment, in the foods industry, in transportation and communications, by government agencies and banks, in offices, as well as in many other areas, in order to transport the goods to be conveyed economically over considerable distances and/or differences in elevation. Conveyor belts generally take the form of endless belts passing over rotatable rollers mounted on stands.

From "Technische Information, Herstellung von Transport-bändern," ®*Trevira Hochfest*, by firm of Hoechst AG, conveyor belts are known that contain polyester, cotton, nylon 6.6, steel, rayon, cellulose fiber or steel fabrics as skeleton. These fabrics are coated with PVC, latex, polyurethane, rubber or fluorine polymers. The yarns contained exhibit a high strength and a low maximum tensile [el]ongation of not more than 22%, so that small surface elongations of only 1 to 2% occur in a conveyor belt produced therefrom.

From *Conveyor Belt Technology*, Volume I/86, Trans Tech Publications, Federal Republic of Germany 1987, methods of cleaning conveyor belts are known. Means are described for turning the belt, means of washing, spraying, airblasting and aspiration. Also, devices for beating, brushing, wiping and scraping by means of stripping elements are described.

Elastic fabrics for paper machines are disclosed in EP A 0,379,967, U.S. Pat. No. 5,225,270, EP B1 0,446,355 and EP A 0,549,917. These fabrics contain elastic monofilaments and are produced in the form of endless strips. The fabrics are generally built up of several layers, the supper layer being a needle felt.

The multilayer fabric described in EP 0,549,917 for conveyor belts in paper machines comprises a supporting fabric that may contain thermoplastic elastomer copolyether ester monofils of ®Riteflex by firm of Hoechst Celanese Corp., USA. The supporting fabric, as viewed in cross-section, is so bound that twice the number of wet threads will lie on the top of the fabric than on the bottom. According to the data in this source, the fabrics described may optionally comprise elastic threads in machine direction. As to the arrangement or orientations of the elastic threads in relation to the running direction of the conveyor belt, there is no information.

EP A 0,379,967 describes monofils of a thermoplastic elastomer polyether ester containing at least 5 wt. % polyurethane as elastomer component, and their use in textiles for conveyor and drying belts and for supporting fabrics of needle felts.

U.S. Pat. No. 5,225,270 describes a needle felt for paper machines consisting of elastic monofils with a proportion of, among other things, at least 30 wt. % polyphenylene ether and at least 30 wt. % polyamide.

EP B1 0,446,355 likewise describes supporting fabrics for paper machine needle felts of elastic monofils. The monofils used consist of an elastomer block copolymer with hard segments of polyamides and soft segments of polyethers. To enhance dimensional stability, it is proposed that the elastic monofils be employed only in the direction of the width of the supporting fabric.

Thus the problem still remained of developing a conveyor belt having adequate extensibility in running direction and suitable for transporting goods with a cleaning zone by the method of the invention.

The present invention relates to a conveyor belt (5) containing an areal textile configuration based on predominantly synthetic yarns, characterized in that the belt is in the form of an endless strip, the yarns extending in the running direction of the belt being elastic, the elastic yarns having a maximum tensile elongation of at least 60% and consisting at least 70 wt. %, referred to the total weight of the yarn, of a thermoplastic elastomer copolyether ester containing the recurrent structural units of formulas I and II,

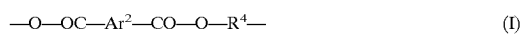

$$-O-OC-Ar^2-CO-O-R^4- \quad \text{(I)}$$
$$-O-OC-Ar^3-CO-O-R^5- \quad \text{(II)}$$

where $Ar^2$ and $R^3$, independently of each other, represent bivalent aromatic radicals, $R^4$ represents a bivalent aliphatic or cycloaliphatic radical, and $R^5$ represents the bivalent radical of a polyalkylene ether.

The conveyor belts may be built up of one or several layers. Thus it is possible for example that besides the areal textile configuration, still other, non-textile layers, such as for example rubber layers or coatings, are present. For certain applications in the foods industry, it may be expedient for the conveyor belt to consist preferably of an upper and a lower layer of an areal textile configuration, an additional layer of rubber or plastic being located between these two layers.

Especially preferred are conveyor belts containing only one layer of an areal textile configuration.

Preferably the conveyor belts are uncoated. These so-called light conveyor belts, except for operations commonly used for the dressing of yarns, such as for example smoothing or avivage, exhibit no additional films or coatings, such as rubber, latex or PVC matrix for example.

The areal textile configurations contained in the conveyor belts according to the invention are preferably woven, knit, fleece, laid or spiral fabrics. Especially preferred are areal textile configurations in the form of woven fabrics.

The term 'yarn' in the context of this description is to be understood in its broadest imaginable sense. The term includes for example monofilaments, multifilament yarns, staple fiber yarns, and two-component yarns, or mixtures of these as well.

Preferred are at least those yarns which go in running direction of the conveyor belt, monofilament yarns, so-called monofils that is to say. Especially preferred in the conveyor belts according to the invention are areal textile configurations made entirely of monofilaments.

In the context of this description, a yarn extending in running direction of the conveyor belt is understood to be a yarn which, considered over a fairly great length of yarn, extends practically parallel to the running direction of the conveyor belt. Such a yarn generally does not extend quite exactly along a straight line, but may certainly deviate slightly from the theoretical direction in smaller subregions. Such a deviation may for example occur in weaving or quite generally due to minor inaccuracies in the production of the conveyor belt.

By a 'thermoplastic, elastomer copolyether ester' in the context of this description is meant a polymer whose vitreous transition temperature is below 23° C., preferably below 0° C.

Preferably the thermoplastic elastomer copolyether ester contains at least 80 wt. %, in particular at least 95 wt. %, referred to the total weight of the thermoplastic, elastomer copolyether ester, of the recurrent structural units of formulas I and II. Very specially preferred are thermoplastic, elastomer copolyether esters containing at least 98 wt. % of these structural units.

Preferably $Ar^2$ and $Ar^3$ independently of each other stand for a phenylene and/or a naphthylene radical.

It is especially preferred for $Ar^2$ and $Ar^3$ each to stand for 1,4-phenylene.

$R^4$ as a bivalent aliphatic radical stands for straight-chain or branched alkalene or alkylidene; these are usually radicals having 2 to 20 carbon atoms, preferably 2 to 8 carbon atoms and in particular 2 to 4 carbon atoms.

It is especially preferred for $R^4$ to be straight-chain alkylene with 2 to 6 carbon atoms, in particular ethylene.

$R^4$ as a bivalent cycloaliphatic radical usually stands for a radical containing 5 to 8, preferably 6 ring carbon atoms; with special preference, this carbon ring is part of an aliphatic chain. An example of an especially preferred representative of this type is the radical of cyclohexanedimethanol.

With especial preference, $R^4$ is a radical of the formula $-C_nH_{2n}-$ where n is a whole number between 2 and 6, or a radical derived from cyclohexanedimethanol.

$R^5$ as a bivalent radical of a polyoxyalkylene usually stands for a polyether radical having recurrent oxyethylene, oxypropylene or in particular oxylbutylene units or mixtures of these units.

With especial preference, $R^5$ stands for a radical of the formula III

    (III)

where o is a whole number from 2 to 4 and z a whole number from 1 to 50.

With quite especial preference, o stands for 4 and z is a whole number from 10 to 18.

With especial preference, thermoplastic and elastomer copolyether esters containing the above defined recurrent structural units of formulas I and II are employed where $Ar^2$ and $Ar^3$ stand for 1,4-phenylene, $R^4$ is ethylene, $R^5$ is a group of the above defined formula III, o stands for 4, and where the proportion of recurrent structural units of formula III, referred to the proportion of the polyester molecule, is 5 to 60 wt. %.

Yarns consisting of such thermoplastic elastomer copolyether esters, depending on the proportion of recurrent structural units of formula III, have different melting points; the higher the proportion of these structural units, the lower the melting point can be set. Thus for example yarns of a thermoplastic and elastomer copolyether ester of this type with a content of 13 wt. % poly-oxybutylene have a melting point of about 220° C., whereas yarns of a thermoplastic and elastomer copolyether ester of this type with a content of 53 wt. % poly-oxybutylene have a melting point of about 160° C.

When in the structural formulas defined above any radicals stand for bivalent aliphatic radicals, this is understood to mean branched and in particular straight-chain alkylene, for example alkylene having 2 to 20, preferably 2 to 8 carbon atoms. Examples of such radicals are ethane-1,2-diyl, propane-1,3-diyl, butane-1,4-diyl, pentane-1,5-diyl, hexane-1,6-diyl or octane-1,8-diyl.

When in the structural formulas defined above any radicals stand for bivalent cycloaliphatic radicals, this is understood to mean groups containing carbocyclic radicals having 5 to 8, preferably 6 ring carbon atoms. Examples of such radicals are cyclohexane-1,4-diyl or the group $-CH_2-C_6H_{10}=CH_2-$.

When in the above defined structural formulas any radicals stand for bivalent aromatic radicals, they are uni- or multinuclear aromatic hydrocarbon radicals or heterocyclic aromatic radicals, which may be uni- or multinuclear. In the case of heterocyclic aromatic radicals, these in particular exhibit 1 or 2 oxygen, nitrogen or sulfur atoms in the aromatic nucleus.

Multinuclear aromatic radicals may be condensed with each other or connected by way of C—C bonds or by way of bridge groups such as —O—, —S—, —CO— or —SO—NH— groups.

The valence bonds of the bivalent aromatic radicals may be in para or comparable coaxial or parallel position in relation to each other, or else in meta or comparable angular position to each other.

The valence bonds standing in coaxial or parallel position to each other are oppositely directed. An example of coaxial, oppositely directed bindings are biphen-4,4'-diyl bindings. An example of parallel oppositely directed bindings are the naphthalin-1,5 or -2,6 bindings, whereas the naphthalin-1,8 bindings are parallel and directed alike.

Examples of preferred bivalent aromatic radicals whose valence bindings are in parallel or comparable coaxial or parallel position to each other are uninuclear aromatic radicals with free valences in para position to each other, in particular 1,4-phenylene, or binuclear condensed aromatic radicals having parallel, oppositely directed bindings, in particular 1,4-, 1,5- and 2,6-naphthylene, or binuclear aromatic radicals linked by way of a C—C binding with coaxial oppositely directed bindings, for example 4,4'-biphenylene.

Examples of preferred bivalent aromatic radicals whose valence bindings are in meta or comparable angular position to each other are uninuclear aromatic radicals having free valences in meta position to each other, in particular 1,3-phenylene, or binuclear condensed aromatic radicals with bindings directed at an angle to each other, in particular 1,6- and 2,7-naphthylene, or binuclear aromatic radicals connected by way of a C—C binding with bindings directed at an angle to each other, in particular 3,4'-biphenylene When any radicals stand for bivalent araliphatic radicals, this is to be understood to mean groups containing 1 or more bivalent aromatic radicals combined by way of one or both valences with an alkylene radical. A preferred example of such a radical is the group $-C_6H_4-CH_2-$.

The recurrent structural units of formulas I, II are typical hard and soft segments. Thermoplastic polyesters of this type are known and described for example in Domininghaus, *Die Kunststoffe und ihre Eigenschaften* [The synthetics and their properties], 3rd edition, VDI Verlag GmbH, Düsseldorf 1988, pp. 518–524.

All of these aliphatics, cycloaliphatics, aromatics, araliphatics or polyoxyalkylene radicals may be substituted with inert groups. By this is meant substituents that do not negatively affect the application in view.

Examples of such substituents are alkyl, alkoxy or halogen.

By alkyl radicals is meant branched and in particular straight-chain alkyl, for example alkyl having 1 to 6 carbon atoms, in particular methyl.

By alkoxy radicals is meant branched and in particular straight-chain alkoxy, for example alkoxy having 1 to 6 carbon atoms, in particular methoxy.

When any radicals stand for halogen, this is for example fluorine, bromine or in particular chlorine.

The elastic yarns contained in the conveyor belts according to the invention consist preferably of at least 70 wt. %, in particular at least 95 wt. %, of the thermoplastic elastomer copolyether esters above described. Quite especially preferred are yarns consisting entirely of the thermoplastic elastomer copolyether esters above described.

The elastic yarns may, besides the thermoplastic, elastomer copolyether ester, contain up to a quantity of 30 wt. % of elastomer or non-elastomer spinnable polymer different from the thermoplastic, elastomer copolyether esters above described. These may for example be elastomer or non-elastomer spinnable polymers based on polyesters, polyamides or polyurethanes or polyolefins.

In the thermoplastic elastomer copolyether ester, still other block copolymers may [be] contained, as for example small amounts of copolymers based on non-elastomer or elastomer polyamides or polyurethane. Preferably the proportion of polyurethane is less than 5 wt. %, in particular less than 2 wt. %, referred to the total quantity of thermoplastic elastomer copolyether ester. Quite especially preferred are thermoplastic, elastomer copolyether esters consisting exclusively of block polymers based on polyester.

An example of a commercial thermoplastic elastomer copolyether ester suitable for production of the elastic yarns, preferably the elastic monofilaments, in the conveyor belts according to the invention, is the product obtainable under the designation ®Riteflex from the firm of Hoechst Celanese Corp.

The elastic yarns, besides the copolyester described above, may also contain small amounts of admixtures and additives of non-polymer kind, as for example catalyst residues, modifying additives, fillers, matting agents, pigments, dyes, stabilizers such as UV absorbers, antioxidants, hydrolysis-, light- and temperature-stabilizers and/or processing aids, plasticizers or lubricants. Preferably these additives are present in a concentration of 0.01 to 5 wt. %, in particular 0.1 to 2 wt. %. The catalyst residues may for example be antimony trioxide or tetraalkoxytitanate. As processing aids or lubricants, use may be made of siloxanes, in particular polymer dialkyl or diaryl siloxanes, salts and waxes as well as longer-chain organic carboxylic acids, that is, such having more than 6 carbon atoms, aliphatic, aromatic and/or perfluorinated esters and ethers in amounts up to 1 wt. %. The elastic yarns may also contain inorganic or organic pigments or matting agents, as for example organic dye pigments or titanium dioxide, or carbon black as a coloring or conductivity additive. As stabilizers, use is made for example of phosphorus compounds, as for example phosphoric acid esters, and besides, where required, viscosity modifiers and substances for modifying the crystalline melting point and/or the vitreous transition temperature, or such as influence the kinetics of crystallization, or the degree of crystallization, may be employed. As viscosity modifiers, for example multivalent carboxylic acids or their esters, such as trimesic or trimellitic acid, or multivalent alcohols, as for example diethyleneglycol, triethyleneglycol, glycerin or pentaerythritol, are employed. These compounds are either mixed with the finished polymers in small amount or, preferably, added in desired quantity as copolymerization constituents in the production of the polymers.

The elastic yarns employed in the conveyor belt according to the invention preferably exhibit a knot strength of at least 8 cN/tex, in particular 12 cN/tex.

Preferably, the elastic yarns exhibit a maximum tensile elongation between 65 and 110%. Especially preferred are elastic yarns exhibiting a maximum tensile elongation of 70 to 90%, in particular 75 to 85%.

Strength and maximum tensile elongation were determined in accordance with German Standard DIN ISO 2062 (1995).

The knot strength (knot tensile test) was determined according to DIN 53842 Part 1, where, in departure from the standard, knots with direction of rotation Z were always produced in strength testing.

The conveyor belt according to the invention exhibits a surprisingly high resistance to wear. If the conveyor belt is employed by the method of the invention, it must survive a large number of extension and compression cycles.

During an extension or compression cycle, the areal textile configuration in the conveyor belt is stretched a certain amount and then relieved. The conveyor belt according to the invention retains its original stability of shape even after many stress cycles. A suitable measurement technique for characterizing this property is represented by the so-called long-term dimensional stability. The long-term dimensional stability is defined in analogy to the tensile stress coefficient $C_n$ described in DIN 53835 Part 2.

Determination of long-term dimensional stability:

Long-term dimensional stability was determined in close correspondence to the hysteresis tensile test of DIN 53835 Part 2. In the hysteresis tensile test, an elastic yarn is strung between two clamps in a tensile testing machine (type, UPM Zwick 1455). By moving the clamps, a tensile stress is applied to the yarn, the clamps moving between an upper and a lower elongation limit. By moving the clamps, the specimen is stretched between the elongation limits without pause at the points of reversal, smoothly at a preassigned clamp velocity. At the same time, the tensile stress—change-of-length curves are recorded. The tensile stress coefficient $C_n$ in each elongation cycle (n=number of elongation cycles) is the ratio of the tensile stress at half total elongation under load to the tensile stress at total elongation. On the basis of the nature of elastic monofils, DIN 53835 Part 2 has required modification as follows:

Number of elongation cycles 100

Lower elongation limit 5%

Upper elongation limit 10%

Prestress (stress at which the specimen is strung in the testing machine) 0.25 cN/tex Free strung length 500 mm Clamp velocity 500 mm/minute Number of measurements for the mean, 10

The determination of long-term dimensional stability as above described may be performed on dry yarns in standard climate or, as becomes important when the conveyor belt is employed under damp climatic conditions, on wet yarns as well. To determine long-term dimensional stability on wet yarns, the specimens are stored in tap water at room temperature for at least 24 hours before testing. The test samples are taken singly and tested after not more than 60 seconds.

The elastic yarns preferably exhibit a long-term dimensional stability $C_{100}$ of more than 0.60. With especial preference, the value of the long-term dimensional stability $C_{100}$ is higher than 0.65, in particular in a range from 0.67 to 0.8.

Preferably the elastic yarns exhibit a softening point between about 110° and 200° C. The melting point is preferably between about 150° and 235° C., in particular between about 190° and 210° C.

The strength of the elastic yarns is preferably at least 12 cN/tex. Especially preferred are elastic yarns having a strength of at least 17 cN/tex, in particular at least 20 cN/tex.

The elastic yarns described above preferably exhibit a thermal shrinkage at a temperature of 180° C. above the thermal shrinkage of polyethylene terephthalate at that temperature. In general, the values of the thermal shrinkage at 180° C. are below 50%, in particular below 30%. Especially preferred are yarns having a thermal shrinkage in the range from 20 to 25%.

As yarns extending perpendicular to the running direction of the conveyor belt, yarns are used that contain synthetic organic fibers based on polyamides, polyesters, polyolefins or polyurethanes or inorganic fibers, as for example glass fibers or carbon fibers, or else mixtures of these kinds of fibers. The yarns may be processed smooth, crimped or spiraled.

Preferably the yarns extending perpendicular to the running direction of the conveyor belt are non-elastic yarns based on non-elastomer polyesters, polyamides or polyolefins having a maximum tensile elongation of less than 60%.

Especially preferred are the non-elastic yarns-monofilaments of non-elastic synthetic fibers based on unmodified or else modified polyesters. For example, the non-elastic yarns may be polyethylene terephthalate monofilaments, as, say, ®Trevira monofil by firm of Hoechst Trevira GmbH & Co. KG.

In another especially preferred embodiment, non-elastic yarns contain dirt-repellent modified polyesters, as in particular polyethylene terephthalate with an addition of up to 20 wt. %, preferably 15 wt. % polytetrafluoroethylene or polyvinylidene fluoride. An example of a dirt=repellent yarn according to the invention is the polyester monofil ®Easy Kleen by firm of Hoechst Trevira GmbH & Co. KG.

With especial preference, the yarns extending perpendicular to the running direction of the conveyor belt exhibit a maximum tensile elongation of less than 25%, in particular less than 20%.

The yarns employed in the conveyor belt according to the invention preferably exhibit a diameter between 10 and 1500μ. With especial preference, the diameter is in the range from 100 to 800μ. The titer is preferably in a range from about 1 to 24400 dtex, in particular 300 to 2000 dtex.

The diameter of the usable yarns fluctuates but little. Preferably the fluctuations amount to only about ±5%, in particular only ±3%, referred to the mean diameter of the yarn. Especially preferred are yarns having a very slightly fluctuating diameter, by ±1%.

The areal textile configurations in the conveyor belts according to the invention are so arranged that the elastic yarns described above extend in the running direction of the conveyor belts. This means that the areal textile configurations predominantly, that is at least 65 wt. %, consist of the elastic yarns described above. Especially preferred are conveyor belts containing at least 90 wt. %, in particular at least 98 wt. %, of the elastic yarns described above in running direction.

The areal textile configurations employed in the conveyor belt according to the invention may be of multilayer construction but is preferably of single-layer construction.

Preferably the areal textil configuration exhibits a weight per unit area of 100 to 1000 g/m², in particular a weight per unit area of 200 to 800 g/m².

The width of the conveyor belt depends on the desired application. Preferably the width is more than 4 cm, preferably more than 50 cm. Especially preferred are conveyor belts having a width of not more than 5 m. Quite especially preferred is a width in the range from 50 cm to 3 m.

The length of the conveyor belt, or its circumference when endless, is preferably greater than 5 m. In particular, the length is more than 20 m.

Preferably the yarns are processed by weaving, knitting, netting, as for example weft rascheling, or spiralizing, to make areal textile configurations. It is possible for multifilament yarns or staple fiber yarns as well as monofilaments to be processed in the areal textile configurations. Preferably, the areal textile configurations are made of monofilaments.

If the areal textile configurations employed in the form of spiraled cloths, both the spirals and the lacing wires may consist of elastic material. Preferably, either only the spirals or only the lacing wires consist of elastic material. With especial preference, the spirals are made of the elastic material and the wires of the less elastic material.

With especial preference, the yarns employed are woven on today's conventional looms, using the machine parameters conventional in the weaving of polyethylene terephthalate, to form the areal textile configurations. Examples of suitable looms are projective or grab looms. In particular, yarns are woven on conventional broad looms, using the machine parameters.

If the areal configurations are produced by weaving, all modes of binding known per se are possible. Atlas bindings or body bindings are preferred as woven types.

The size of the interstices, or mesh-like openings, in the areal textile configurations (pore size), through which for example dirt may drop when these interstices are opened by the method of the invention, may be adjusted within wide limits by measures known per se in the production of the areal textile configurations, as for example by suitable choice of binding, titer, weight per unit area etc. In this way, the conveyor belt may be adapted to the particular field of employment.

The conveyor belts according to the invention are especially resistant to the action of UV light, chlorine and alkaline media.

Further, the conveyor belts exhibit an especially high dye absorption. They will therefore tint especially well.

Preferably, the conveyor belt according to the invention may be produced entirely from areal textile configurations based on polyesters. This is especially advantageous if, besides good strength, attention must be paid to purity of type ("recycling").

Preferably, the areal textile configuration employed in the conveyor belt according to the invention may be additionally smoothed, for example in order to reduce adhesion of the conveyor belt [to] the goods to be conveyed, or to diminish undesirable constituents, such as food remnants, or to reduce the rolling friction at rollers that may be present to guide the conveyor belt. A smoothing may for example be accomplished by pressing the areal textile configuration on one or both sides by means of a calender.

By the term "monofil" in the present invention is meant a single endless fiber of definite thickness. It may be of any cross-section, for example round, oval or elliptical, bi- or multilobal, strip-like or n-gonal. Round monofils are preferred.

The conveyor belt according to the invention may contain seams, if the process used to produce the endless conveyor belt requires several component pieces to be connected together. If the areal textile configurations are produced for example on special cylindrical looms, the conveyor belts may alternatively be produced directly in the form of an endless strip.

The invention also relates to a method of transporting goods by means of a traveling conveyor belt (5), characterized in that the conveyor belt undergoes a continuous area variation by way of guide elements (2, 3, 9), such as rollers for example, with the aid of guide elements (2, 9) in an extension or compression zone (1).

By the term 'continuous area variation' in the context of this description is meant that the conveyor belt is made greater and/or smaller in the direction of travel and/or in the direction of the width of the belt. An enlargement of the area occurs for example if the conveyor belt is drawn apart in the extension or compression zone (1) by forces acting upon it, which may for example be transmitted to the conveyor belt by the guide elements (2, 9). A diminution occurs if the conveyor belt is pre-stressed outside of the zone, and the stress is less inside the zone than outside. Examples of devices for stretching and transporting the conveyor belts are systems of rollers, frames or grippers. The area variation of the conveyor belt takes place 'continuously' because the belt travels at a certain velocity, and so new portions constantly enter the extension or compression zone continuously.

At the same time, the attitude of the conveyor belt in the extension or compression zone, preferably cleaning zone, is in principle arbitrary, for example, in this zone the conveyor belt may be arranged vertically or else horizontally, to support the detachment of constituents to be eliminated from the belt. Where expedient, some particular oblique attitude of the conveyor belt may be advantageous in the zone, for example to detach dust from the conveyor belt. If the method according to the invention is employed to separate the conveyor belt from unwanted constituents, the oblique attitude must not be extreme enough so that the goods to be transported will fall off the belt.

Preferably, the area variation is accomplished by stretching the conveyor belt in direction parallel to its direction of motion.

Preferably, the areal variation leads to cleaning the conveyor belt of unwanted constituents (7), such as for example dust, dirt, particles, foreign bodies, liquids or coatings, the unwanted constituents being detached from the conveyor belt, or their detachment from the conveyor belt at least assisted. The work performed leads to a reduction of constituents clinging to the conveyor belt. If desired, the detached unwanted constituents may preferably be collected with the aid of a suitable receptacle (10) and returned if appropriate.

The conveyor belt preferably exhibits mesh-like openings, which will open or enlarge in the course of dynamic area variation so that at least some of the unwanted constituents will detach from the belt and drop through the meshes.

Cleaning, or detachment of unwanted constituents from the conveyor belt, may preferably be supported by supply of liquids, such as water, or gases, such as compressed air.

If the cleaning of the conveyor belt is supported by compressed air, a uniform stream of gas or else a pulsed stream may be employed. Especially in the case of a pulsed stream of gas, an especially effective detachment of unwanted constituents results.

It is likewise preferred that the cleaning of the conveyor belt be supported by vibrations, as by shaking the conveyor belt, scraping, combing or brushing.

It is preferred also that the cleaning of the conveyor belt be supported by turning it over.

In certain cases it may be required that the mesh-like openings in the conveyor belt should not contract in the direction of the width, or at least should retain their size in that direction. Within the limits of elongation preassigned by the material parameters of the conveyor belt, the belt may alternatively be enlarged somewhat in the direction of the width, so as to enlarge the openings in that direction. Preferably the cleaning of the conveyor belt is supported by area variation of the mesh-like openings by means of a frame that enlarges, reduces or maintains the size of the meshes in the direction perpendicular to the direction of travel of the belt.

Preferably the conveyor belt takes the form of an endless strip and passes over guide elements, as for example rollers.

Preferably the method according to the invention may also be combined with other operations known per se, such as drying, heating, cooling, laminating, dusting or coating.

The present invention relates also to the use of the conveyor belt above described in transport systems, preferably conveyor belts in the foods industry, in mining, in animal feeding or in the dyes industry.

If the conveyor belts according to the invention are employed for the foods industry, they may be so fabricated that, in line with the requirements of food legislation, they will give off practically no chemicals to the food. Preferably, therefore, the conveyor belts exhibit no additional coatings besides the areal textile configurations.

Another object of the invention is a transport device comprising

A conveyor belt (5),

At least two guide elements of a first kind (2, 9), as for example rollers or cylinders, over which the conveyor belt travels, Optionally, additional guide elements of a second kind (3), over which the conveyor belt likewise travels and which may additionally propel the conveyor belt if required, where the guide elements of the first kind may each be driven at different speeds, so that the conveyor belt traveling over these guide elements will be extended or compressed in the zone (1) located between the guide elements of the first kind.

Figure 2:
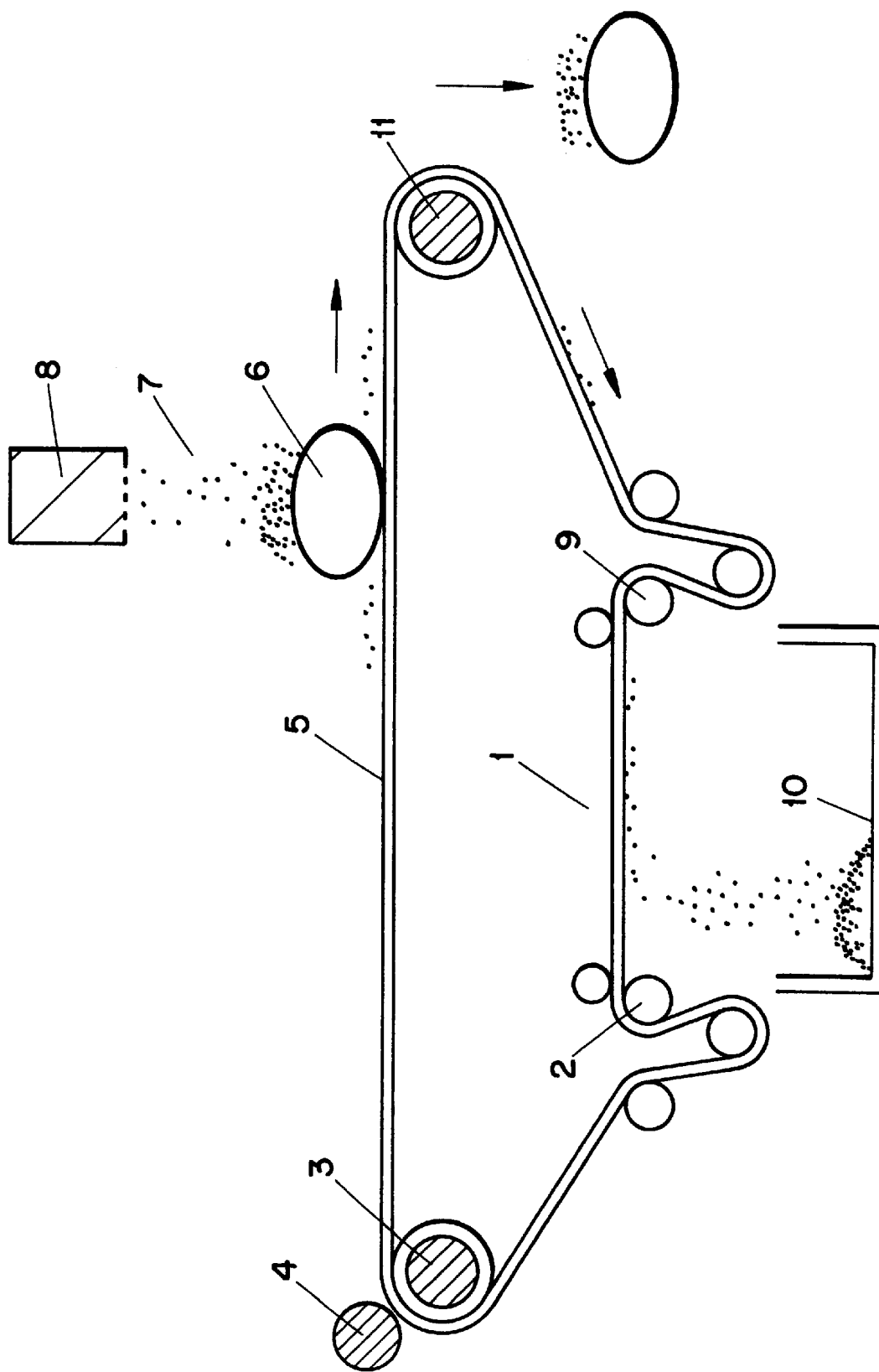

Examples of transport systems according to the invention are shown in FIGS. 1 and 2.

FIG. 1 shows how, by the method according to the invention, foods (6) such as for example rolls or doughnuts (berliners) may be sprinkled with for example powdered sugar or flour (7). Before sprinkling, the foods are placed on the conveyor belt (5), and afterwards removed. The conveyor belt travels continuously over cylinders (3) and rollers (2, 9), and is optionally fixed to the cylinders (3) by means of contact rollers (4). By means of an applicator (8), the powdered sugar or flour is sprinkled on the food (6). This will tend to soil the conveyor belt. Within the zone formed by the system of rollers (2) and (9), the conveyor belt is stretched so that dirt particles will detach from the belt and drop through the openings in the belt. The detached dirt particles may be collected in a receptacle (10).

FIG. 2 likewise shows a conveyor belt for foods. In contradistinction to FIG. 1, the sprinkled foods are carried on as far as the roller (11) arranged at the right, when they drop from the conveyor belt. This leaves the dirt particles retained on the conveyor belt at least in part. Within the zone formed by the system of rollers (2) and (9), the detachment is assisted by the stretching of the conveyor belt, so that they will drop from the under side of the belt.

Examples of conveyor belt manufacture:

The following monofilaments were investigated for suitability as elastic yarn in conveyor belts according to the invention.

®Elas-Ter by firm of Hoechst Trevira GmbH & Co. KG (thermoplastic copolyether ester, according to the invention)

PA 6 (®Perlon, polyamide, for comparison)

®Trevira 936B (PBT monofil, for comparison)

®Trevira 900S (PET monofil, for comparison)

The results of measurements of the specifications of these monofilaments are shown in Table 1.

From the monofilaments listed, a fabric was produced by weaving on a broad loom. In so doing, monofils of various diameters were processed. In the warp, elastic monofils of type ®Elas-Ter of 0.17 mm diameter were used. In the upper wefts, non-elastic monofils of ®Trevira 900S with a diameter of 0.2 mm were used, and in the lower wefts, monofils of the same type and same diameter. Then the fabric obtained was treated on a suitably dimensioned thermofixing means for smoothing, to establish the specific pore sizes or openings in the fabric as desired from case to case, and processed to make an endless conveyor belt.

TABLE 1

| Test | PA 6 (*Perlon) (comparison) | PBT-Monofil (*Trevira 936B) (comparison) | PET-Monofil (*Trevira 900S) (comparison) | *ELAS-TER Type 9PX167A (invention) |
|---|---|---|---|---|
| Diameter (nom.) [mm] | 0.25 | 0.20 | 0.25 | 0.25 |
| Titer (tr) [dtex] | 518 | 404 | 706 | 637 |
| Strength [cN/tex] | 50 | 40 | 36 | 22 |
| Max. tensile elongation | 49% | 23% | 43% | 82% |
| Knot strength [cN/tex] | 22 | 11 | 21 | 14 |
| Long-term dimensional stability $C_{100}$ - dry - | 0.52 | 0.39 | 0.10 | 0.69 |
| Long-term dimensional stability $C_{100}$ - wet - | 0.54 | 0.41 | | 0.68 |

What is claimed is:

1. A conveyor belt containing an areal textile configuration based on predominantly synthetic yarns wherein the conveyor belt has the form of an endless strip and the yarns are elastic and extend in the running direction of the conveyor belt with said elastic yarns having a maximum tensile elongation of at least 60% and wherein at least 70% of the total yarn weight is a thermoplastic elastomeric copolyether ester containing the recurrent structural units of formulas I and II,

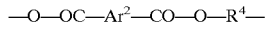
$$-O-OC-Ar^2-CO-O-R^4-  \quad (I),$$

and

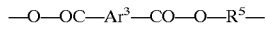
$$-O-OC-Ar^3-CO-O-R^5-  \quad (II),$$

where $Ar^2$ and $Ar^3$, independently of each other, represent bivalent aromatic radicals, $R^4$ represents a bivalent aliphatic or cycloaliphatic radical, and $R^5$ stands for the bivalent radical of a polyalkylene ether.

2. A conveyor belt according to claim 1 wherein there are non-elastic synthetic yarns extending perpendicular to the running direction of the belt that are based on non-elastomeric polyesters, polyamides or polyolefins having a maximum tensile elongation of less than 60%.

3. A conveyor belt according to either of claims 1 and 2, wherein said belt is uncoated.

4. A conveyor belt according to at least one of claims 1 to 3, wherein said yarns are monofilaments.

5. A conveyor belt according to at least one of claims 1 to 4, that exhibits long-term dimensional stability, as expressed by the tensile stress coefficient $C_{100}$ of the yarns after the 100th elongation cycle of greater than 0.60, $C_{100}$ being determined according to the hysteresis tensile test of DIN 53835 Part 2 with an elongation cycle between 5 and 10%, a prestress of 0.25 cN/tex, a free strung length of 500 mm, and a clamp velocity of 500 mm/minute.

6. A conveyor belt according to at least one of claims 1 to 4, that exhibits long-term dimensional stability, as expressed by the tensile stress coefficient $C_{100}$ of the yarns after the 100th elongation cycle of greater than 0.65, $C_{100}$ being determined according to the hysteresis tensile test of DIN 53835 Part 2 with an elongation cycle between 5 and 10%, a prestress of 0.25 cN/tex, a free strung length of 500 mm, and a clamp velocity of 500 mm/minute.

* * * * *